Nov. 1, 1966    E. A. VOS ET AL    3,282,031
CENTRIFUGAL GAS ANCHOR
Filed April 22, 1964

INVENTORS:
EDUARD ARTHUR VOS
JOHANNES J. M. VAN OOSTERHOUT
BY: *Oswald H. Milmore*
THEIR ATTORNEY

United States Patent Office 3,282,031
Patented Nov. 1, 1966

3,282,031
CENTRIFUGAL GAS ANCHOR
Eduard A. Vos, Wichita, Kans., and Johannes J. M. van Oosterhout, Rijswijk, Netherlands, assignors to Shell Oil Company, New York, N.Y., a corporation of Delaware
Filed Apr. 22, 1964, Ser. No. 361,803
Claims priority, application Great Britain, June 21, 1963, 24,899/63
8 Claims. (Cl. 55—203)

This invention relates to an apparatus for separating gas and liquid from a gas-liquid mixture, and in particular to a gas-liquid separator (also called a gas anchor) which can be placed in a production well extending into an oil-bearing formation in order to separate the oil-gas mixture issuing from this formation into an oil stream and a gas stream. The oil stream, which may include water, is led via a well pump placed in the production well and associated tubing to the wellhead, and the gas stream is passed around the well pump to the wellhead via the annular space between the tubing and a casing concentrically arranged around it. The higher the quantity of gas separated from the gas-oil mixture by means of the gas anchor before this mixture is passed to the well pump, the higher the quantity of oil which can be pumped per unit of time by this well pump. The oil output of an existing well, having a pump of given capacity therein, can thus be increased by the use of a gas anchor.

Broadly, the invention pertains to an apparatus for separating gas and liquid from a gas-liquid mixture and comprises a cup-shaped member rotatable around the longitudinal axis thereof, means for rotating the cup-shaped member, such as a prime mover connected thereto, vanes radially arranged within the cup-shaped member, means for supplying the gas-liquid mixture to the open top of the cup-shaped member, conduit means for draining separated liquid from a point near the bottom of the cup-shaped member and means for leading away separated gas from the top of the cup-shaped member.

The conduit means for draining the liquid preferably consists of a tube centrally arranged within the cup-shaped member and having an open end near the bottom of the cup-shaped member. The radial vanes then extend between the outer wall of the tube and the inner wall of the cup-shaped member.

A cylindrical housing may be arranged around the rotary cup-shaped member, bearing means being provided for centering the cup-shaped member within the housing.

Figure 1:
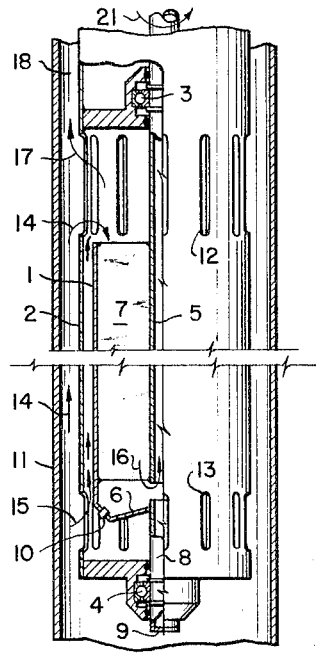
Figure 2:
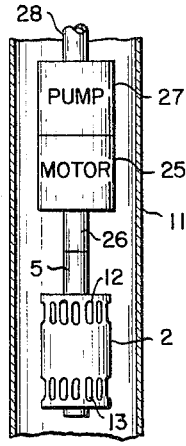
Figure 7:
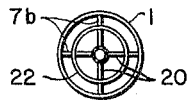
Figure 8:
Figure 6:
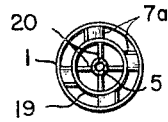
Figure 4:
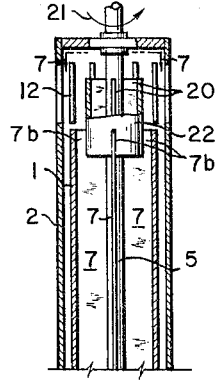
Figure 5:
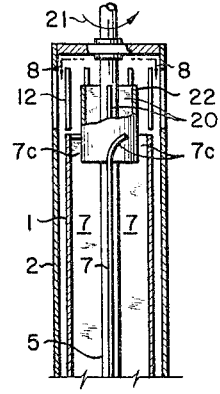
Figure 3:
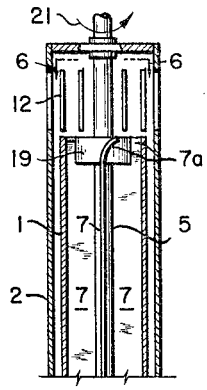

The invention may be performed in various ways and some specific embodiments will now be described by way of example with reference to the accompanying drawings, wherein:

FIGURE 1 shows schematically partly an elevation and partly a longitudinal section of a gas anchor embodying the invention;

FIGURE 2 schematically shows the gas anchor and motor means for rotating the cup-shaped member mounted within a well casing;

FIGURES 3, 4 and 5 show alternative forms of means arranged at the top of the cup-shaped member for improving the leading away of the separated gas; and, FIGURES 6, 7 and 8 are transverse sectional views of the constructions shown in FIGURES 3, 4 and 5, taken on the lines 6—6, 7—7 and 8—8, respectively.

In FIGURE 1 there is shown a rotary cup-shaped member 1 centrally arranged within a protective cylindrical housing 2. Bearings 3 and 4 are arranged in the housing 2 for supporting and centering the cup-shaped member therein. Centrally within the cup-shaped member there is arranged a tube 5 which has its open lower end at a short distance above the bottom 6 of the cup-shaped member 1. The tube 5 is connected to the cup-shaped member 1 by means of radial vanes 7 extending between the outer wall of the tube 5 and the inner wall of the cup-shaped member 1. If desired, however, other connecting means may be provided for connecting the tube 5 to the member 1. Thus, the lower end of the tube 5 may be connected to the bottom 6 of the member 1, e.g., by welding or screw-threads, openings being provided in the lower part of the tube wall in order that the interior of the tube communicates with the interior of the member 1. The tube 5 passes through the bearing 3 and communicates with the inlet of a well pump 27 (FIGURE 2) which is arranged at a level higher than the gas anchor.

To the bottom 6 of the cup-shaped member 1 there is connected a journal 8 which co-operates with the lower bearing 4. In this particular arrangement the journal 8 is hollow and closed by a plate 9.

If a prime mover, such as an electric motor or a hydraulic motor 25, is arranged above the member 1 for rotating the latter and the pump 27, the upper end of the tube 5 is connected to the rotary output shaft of the prime mover. Preferably the rotary shaft is hollow, one end thereof communicating with the open top end of the tube 5 and the other end communicating with the inlet of the pump. When a coupling is provided between the tube 5 and the rotary shaft of the prime mover, this coupling may be of the flexible type. Thus, in FIGURE 2 the motor 25 has a hollow rotary shaft 26 which is connected to the upper end of the tube 5 and to the suction side of the pump 27 above the motor 25. If desired the tube 26 may further drive the pump 27, although a pump driven from the surface by a sucker rod may be used. A hollow conduit 28 leads to the wellhead (not shown) and may contain any necessary power transmission means for the operation of the motor 25 and pump 27.

The prime mover is preferably an electric motor or a hydraulic motor which is located above or below the gas anchor. When using an electric motor, this motor is preferably arranged below the gas anchor; the flow of the gas-oil mixture to the anchor providing sufficient cooling for the motor. The electric cables can be passed through the oil production tubing or through the annular space 18 between the casing 11 and the oil production tubing. If an electrically actuated rotary well pump is used, the shaft of this pump is preferably mechanically coupled to the rotary cup-shaped member 1.

If a mechanically actuated well pump is used which is activated by means of a sucker rod, the rotational movement of the member 1 may be derived from the reciprocating movement of the piston of the well pump by a suitable mechanism.

If a hydraulic motor such as a hydraulic turbine is used as a prime mover, the feed thereof may be the separated oil (or part thereof) discharged from the gas anchor and the outlet of the motor turbine is connected to the inlet of the well pump.

Instead of using separated oil as a feed for the motor turbine, use may be made of the flow (or of part thereof) of the gas-oil mixture passing out of the formation to the gas anchor. In other embodiments the inlet of the hydraulic motor is connected to the tubing, the other end of which communicates with a pressure source arranged at the surface. The outlet of the hydraulic motor communicates with the interior of the well, preferably with the inlet of the well pump, or is connected to a tubing which leads to the surface. Oil is preferably used as a drive medium.

In still other embodiments the inlet of the hydraulic motor communicates with the outlet of the well pump.

In this case high-pressure liquid is fed to the hydraulic motor. The outlet of the hydraulic motor may communicate with the inlet of the cup-shaped member 1 or with the inlet to the well pump.

If the prime mover for driving the member 1 is arranged at a level lower than the member 1, the shaft of the prime mover is connected to the end of the journal 8 passing through the bearing 4.

The bottom 6 of the cup-shaped member 1 is preferably conically shaped, and sand discharge openings such as wear-resisting nozzles 10, may be mounted in the lower part of the bottom for discharging sand therefrom. Openings 12 are formed at the upper end of the housing 2. Further, there may be provided openings 13 in the lower part of the wall of the housing 2. The openings 12 as well as the openings 13 may be in the form of slits.

For operating the gas anchor in a well producing a gas-oil mixture the whole assembly including the prime mover and the well pump is lowered through a casing 11 down to the bottom of the well. The casing wall may be provided with openings (not shown) providing communication between the oil-producing formation surrounding the casing 11 and the interior of the casing 11.

The operation of the gas anchor as shown in FIGURE 1 is as follows. Due to action of the well pump, a gas-liquid mixture passes out of the formation into the casing 11 and flows in the direction of the arrows 14 via the openings 12 to the open end of the cup-shaped member 1. If openings 13 are provided, part of the gas-liquid mixture enters, in the direction of arrow 15, the annular space between the member 1 and the housing 2 and flows to the open end of the member 1.

On entering the cup-shaped member 1, the gas-liquid mixture is subjected to a centrifugal field created by the rotation of the member 1. A pressure is thereby created in the mixture, which pressure is higher at the circumference than at the center. As the liquid is drained off at the lower part of the cup-shaped member 1 via the tube 5, any gas bubbles present in the mixture will be dragged donwwardly, but at the same time, as a result of the pressure difference in the radial direction, they will move towards the center of the cup-shaped member 1. When a sufficient number of bubbles has collected at the outer wall of the tube 5, they will coalesce and rise along the outer wall of the tube 5 towards the top of the cup-shaped member 1, as the vertical velocity of the liquid is zero along the outer wall of the tube 5. Liquid, free from gas bubbles, can thus be drained from the lower part of cup-shaped member 1 by the tube 5 as shown by arrow 16.

The gas bubbles rising to the top of the cup-shaped member 1 tend to accumulate and coalesce near the top, where the interface between the gas-liquid mixture passing downwardly and the separated gas tends to become a paraboloid. Gas will escape from the gas bubble collected in the top of the cup-shaped member 1, so that the quantity of gas in the top remains substantially constant. The gas released from the gas bubble present in the top of the member 1 escapes through the upper part of the openings 12 (shown by arrow 17) and passes up through the annular space 18 between the casing 11 and the oil production tubing.

At increasing speeds, however, the amount of gas released from the gas bubble present in the top of the member 1 becomes smaller than the amount of gas separated from the gas-liquid mixture passing through the member 1. Consequently, the volume of the bubble will grow until the lower end of the bubble reaches the bottom 6 of the member 1, whereafter separted gas will be discharged through the tube 5 together with separated oil.

When such high speeds are required for the separation of gas from the mixture, the release of gas from the gas bubble to the openings 12 and the annular space 18 is improved by the use of the arrangement shown in FIGURES 3 and 6. In this arrangement, a ring-shaped member 19 is coaxially arranged with respect to the tube 5 and the cup-shaped member 1. Between the inner wall of the member 19 and the outer wall of the tube 5 there are preferably arranged straight radial vanes 20.

The upper parts 7a of the vanes 7 are preferably curved in the direction of rotation (arrow 21) of the cup-shaped member 1. The ring-shaped member 19 maintains the gas volume or gas bubble having a low pressure separted from the gas-liquid mixture having a higher pressure. This latter pressure, which results from the rotation of the member 1 combined with the action of the vanes 7a, increases with the square of the rotational speed and member 19 restores the equilibrium between the gas separated in the cup-shaped member 1 and the gas leaving at the top. In this way a stable, short, gas-filled space is obtained from which the gas escapes in the upward direction towards the upper parts of the openings 12 as a continuous stream of large bubbles.

Alternatives to the construction shown in FIGURE 3 are given in FIGURES 4 and 7 and in FIGURES 5 and 8, respectively. Here the ring-shaped member 22 is extended upwards above the upper ring of the cup-shaped member 1 to form a funnel.

In both latter alternatives the radial vanes arranged within the funnel 22 are of the straight type; the portions of vanes 7 extending over the part of the funnel 22 within the cup-shaped member 1 may be either straight (portions 7b in FIGURES 4 and 7) or curved in the direction of rotation (portions 7c in FIGURES 5 and 8).

In the construction shown in FIGURES 4 and 7 the gas is discharged through the funnel 22 well above the top of the cup-shaped member 1 at a place where static liquid pressure is lower than at the inlet of the cup-shaped member 1.

In the construction shown in FIGURES 5 and 8 the pressure at the inlet of the cup-shaped member is increased by the action of the vane portions 7c. When using this construction, as well as when using the construction shown in FIGURES 4 and 7, the separated gas cannot accumulate in the cup-shaped member but is led away via the openings 12 to the annular space 18.

An initial separation of gas from the liquid-gas mixture occurs where the flow of this mixture is reversed through 180° when entering the cup-shaped member 1. At the top of this inverted U-turn, gas bubbles, provided that they are not too small, will escape directly in the direction of the annular space 18.

The number of vanes 7 in the cup-shaped member 1 as well as the number of vanes 20 in the ring-shaped member 19 or the funnel 22 is preferably from one through five.

We claim as our invention:
1. Apparatus for separating gas and liquid from a gas-liquid mixture comprising:
   a cylindrical housing;
   an elongated open-top cup-shaped member rotatably mounted within said housing and arranged about the longitudinal axis thereof said top of said cup-shaped member being open at all times and defining a common gas-liquid intake and separated gas discharge opening;
   tubular liquid discharge means located centrally and depending within said cup-shaped member, said tubular means having an open end near the bottom of said cup-shaped member;
   means connecting the outer wall of said tubular means to the inner wall of said cup-shaped member;
   means for rotating the cup-shaped member; and,
   intake fluid passageway means through said housing for supplying the gas-liquid mixture outside the cup-shaped member so as to spill over the open top thereof;
   gas discharge means through the wall of said housing for leading away separated gas from the top of said cup-shaped member.

2. Apparatus as set forth in claim 1 further comprising a vertically extending open ended ring member situated, at least in part, within the upper portion of said cup-shaped member and concentrically positioned between said cup-shaped member and the tubular means.

3. Apparatus as set forth in claim 2 wherein the ring member is in the form of a cylindrical funnel and extends upwardly a substantial distance above the top of said cup-shaped member.

4. Apparatus as set forth in claim 1 wherein the means connecting the tubular means to the cup-shaped member comprises a plurality of radially directed vanes.

5. Apparatus as set forth in claim 4 wherein:
 (a) the top edge of each vane is substantially at the level of the top of the cup-shaped member;
 (b) a portion of the top portion of each vane is curved forwardly in the direction of rotation of the cup-shaped member; and,
 (c) a ring member is connected to the tubular member and centrally arranged between the tubular member and the cup-shaped member;
 (d) said ring member extending in the axial direction substantially over the whole length of the curved portion of said vanes.

6. Apparatus as set forth in claim 5 wherein the ring member is in the form of a cylindrical funnel and extends upwardly a substantial distance above the top of said cup-shaped member.

7. Apparatus as set forth in claim 1 wherein said discharge openings are arranged in the wall of the cup-shaped member near the bottom thereof.

8. Apparatus as set forth in claim 7 wherein the bottom of the cup-shaped member is generally cone-shaped with the apex of the cone rising radially inwardly from the outer wall of the cup-shaped member near the bottom thereof.

References Cited by the Examiner

UNITED STATES PATENTS 3,168,474  4/1963  Stallman et al. _____ 233—33

FOREIGN PATENTS 921,350  3/1963  Great Britain.

REUBEN FRIEDMAN, *Primary Examiner.*

R. W. BURKS, *Assistant Examiner.*